(12) United States Patent
Meyer et al.

(10) Patent No.: US 6,843,111 B2
(45) Date of Patent: Jan. 18, 2005

(54) LCC-BASED STRAIN-GAGE SENSOR INTEGRATED WITH CYLINDER-HEAD GASKET

(75) Inventors: Bernard A. Meyer, Taylor, MI (US); Lakhi N. Goenka, Ann Arbor, MI (US); Debojit Barua, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 31 days.

(21) Appl. No.: 10/215,787

(22) Filed: Aug. 9, 2002

(65) Prior Publication Data

US 2003/0074972 A1 Apr. 24, 2003

Related U.S. Application Data

(60) Provisional application No. 60/330,306, filed on Oct. 19, 2001.

(51) Int. Cl.[7] .............................................. G01M 15/00
(52) U.S. Cl. ........................................ 73/116; 73/35.12
(58) Field of Search .......................... 73/35.03, 35.06, 73/35.07, 35.12, 116, 117.2, 117.3, 119 R; 701/29; 340/438, 439

(56) References Cited

U.S. PATENT DOCUMENTS

| | | |
|---|---|---|
| 4,393,687 A | 7/1983 | Müller et al. |
| 5,380,014 A | 1/1995 | Schaperkotter |
| 5,384,467 A | 1/1995 | Plimon et al. |
| 5,619,046 A | 4/1997 | Engström et al. |
| 5,659,132 A | 8/1997 | Novak et al. |
| 5,693,936 A | 12/1997 | Komachiya et al. |
| 5,745,611 A | 4/1998 | Komachiya et al. |
| 5,831,263 A | 11/1998 | Komachiya et al. |
| 5,936,235 A | 8/1999 | Minamitani et al. |
| 6,301,957 B1 | 10/2001 | Sakaguchi et al. |
| 6,320,184 B1 | 11/2001 | Ninklhofer et al. |
| 6,701,775 B1 * | 3/2004 | Popielas et al. ........... 73/35.12 |
| 2003/0074957 A1 * | 4/2003 | Lemecha et al. ........... 73/118.1 |
| 2003/0084859 A1 * | 5/2003 | Glovatsy et al. .......... 123/41.31 |

FOREIGN PATENT DOCUMENTS

| | | |
|---|---|---|
| JP | 10-221195 | 8/1998 |
| JP | 11-132892 | 5/1999 |

OTHER PUBLICATIONS

Combined Search and Examination Report, dated Jun. 18, 2003, for corresponding United Kingdom Application No. GB 0224034.9.

* cited by examiner

*Primary Examiner*—Eric S. McCall
(74) *Attorney, Agent, or Firm*—Brinks Hofer Gilson & Lione

(57) ABSTRACT

An integrated LCC-based strain gage sensor, in which at least two LCC traces or strands run across a microcavity within the cylinder head gasket. In one aspect of the present invention, a system is provided comprising a signal source and a microcavity through which an input signal from the signal source passes and which alters the input signal as a result of a response of the microcavity to a strain. An LCC connects the microcavity and the signal source and an input signal propagates through the LCC. The microcavity may comprise one or more reflective surfaces which alters the input signal as a result of a change in a dimension of the microcavity. In another aspect of the invention, the microcavity produces an output signal that has an intensity or frequency different from that of the input signal upon undergoing a deformation.

24 Claims, 7 Drawing Sheets

LCC-BASED STRAIN-GAGE SENSOR INTEGRATED WITH CYLINDER-HEAD GASKET

This application claims the benefit of a U.S. Provisional Application No. 60/330,306 filed on Oct. 19, 2001, the entirety of which is incorporated herein.

FIELD OF THE INVENTION

The invention generally relates to a sensor for monitoring pressure change inside a cylinder. In particular, the invention relates to a strain-gage sensor for detecting or measuring pressure or pressure changes, wherein the sensor is positioned inside a cylinder head gasket.

BACKGROUND OF THE INVENTION

Strain gages, which are an important diagnostic tool, generally convert mechanical motion into an electrical signal. The strain that such a gage undergoes varies proportionally with the change in capacitance, inductance, or resistance, but the change in resistance is the characteristic most widely used as a measure of strain. Ideally, a strain gage resistance changes only when a surface to which the gage is attached deforms. In reality, various factors such as temperature, the nature of materials, the adhesive that bonds the gage to the material surface, and the stability of the metal can alter the measured resistance. Thus, for example, in choosing the type of strain gage material to use, one has to consider material characteristics such as temperature sensitivity, stability, and resistance.

Various types of strain gages are known. Mechanical gages suffer from low resolution and bulkiness, and they are not easy to use. Typical optical gages are more sensitive and accurate, but they are relatively fragile. For example, while a photoelectric gage can be relatively small, photoelectric gages are expensive and fragile.

Sensors can be used to monitor environmental conditions such as pressure or temperature. For example, such conditions could be monitored using sensors mounted inside an automobile engine or one or more of the engine's components.

Sensors can be particularly useful in monitoring or optimizing engine performance by using them to monitor conditions inside one or more cylinders of an engine. A cylinder head functions to seal the top of the cylinders, provide a mounting for valve train components, provide guides and ports for the intake and exhaust valves, and provide the spark plugs access to the combustion chamber. Each recessed area above the piston in the cylinder head is part of a combustion chamber in which the air and fuel mixture burns. The intake of air and fuel mixture and the exit of burned gases must be regulated to allow the engine to operate properly.

The cylinder head must be sealed tightly to contain the high pressure resulting from the air and fuel combustion. The cylinder head gasket, which is placed between the cylinder head and the engine block, performs this function. Because of the severe environment in the cylinder head, the components around the cylinder head must be able to withstand severe conditions such as temperatures that may vary from −40° C. to +250° C. The cylinder head gasket may also be subjected to very high pressures. Thus, it would be advantageous to be able to monitor in-cylinder conditions using sensors that could withstand the harsh environment within or near the vicinity of the cylinders or other engine components. Monitoring in-cylinder pressure is desirable to obtain better control over engine operation and performance. However, conventional approaches require expensive hardware such as pressure sensors located at each combustion chamber on the cylinder head region.

In addition, traditional wired sensors are usually difficult to assemble and less reliable due to the number of wires involved. Signals passing through wires often cause cross talking and interference with the signal transmission in adjacent wires. Signals passing through wires also cause electromagnetic interference in adjacent wires unless some type of shielding is used. Thus, the signals may become distorted or skewed because of these factors.

BRIEF SUMMARY OF THE INVENTION

Various embodiments of the invention are directed to a system that integrates the sensing function within the cylinder head gasket region and uses novel light strand or light channel communications technology (LCC). Integration of the sensor within the cylinder head gasket provides advantages such as protection from the severe environmental conditions within or around the cylinders or combustion chambers.

The various embodiments or configurations of the invention use an integrated LCC-based strain gage sensor in which two or more LCC traces or strands run across a microcavity within the cylinder head gasket. A main characteristic of an LCC is that a signal, such as an optical signal, diffuses essentially throughout the entire volume of the material comprising the LCC. The microcavity deforms as the cylinder adjacent to the sensor goes through a firing sequence. This deformation is measured by a change in the infrared, or other suitable electromagnetic, signal directed across this cavity through the LCC strands. Thus, the embodiments of the invention provide real-time, cylinder-to-cylinder monitoring for improved engine control. In addition, the various embodiments of the invention provide information such as those relating to cylinder knock, for example.

In one aspect of the present invention, a system is provided comprising a signal source and a microcavity through which an input signal from the signal source passes and which alters the input signal as a result of a response of the microcavity to a strain. An LCC connects the microcavity and the signal source and an input signal propagates through the LCC. At least one detector receives an output signal from the microcavity.

In another aspect of the invention, a system is provided that comprises a signal source and a microcavity comprising one or more reflective surfaces through which an input signal from the signal source passes, and which alters the input signal as a result of a change in a dimension of the microcavity. An LCC connects the microcavity and the signal source and through which the input signal propagates. At least one detector receives an output signal from the microcavity.

In still another aspect of the invention, a system is provided comprising a signal source and a microcavity through which an input signal from the signal source passes and which upon undergoing a deformation, produces an output signal that has an intensity or frequency different from that of the input signal. An LCC connects the microcavity and the signal source and through which the input signal propagates. At least one detector receives an output signal from the microcavity.

A system is also provided comprising a signal source, at least one detector that receives a signal from the signal source, and an LCC through which the signal from the signal source propagates. The LCC, which connects the signal source and the detector, passes through a region where a strain can occur. The LCC undergoes a change in a dimension upon exposure to the strain, which alters the signal from the signal source.

In the systems described above, the microcavity is preferably located within a cylinder head gasket of an engine.

The invention also relates to various methods of monitoring environmental conditions. In one aspect of the invention, a method for monitoring environmental conditions is provided comprising transmitting a signal from a signal source, allowing the signal from the signal source to propagate through an LCC, and detecting a signal that propagates through the LCC using at least one detector. The LCC, which connects the signal source and the detector, passes through a region where a strain can occur. Upon exposure to a strain, the LCC undergoes a change in dimension, and the signal is altered as a result of the LCC's response to the strain.

In another aspect, a method for monitoring environmental conditions is provided which comprises transmitting a signal from a signal source, allowing the signal from the signal source to propagate through an LCC and a microcavity, and detecting an output signal from the microcavity using at least one detector. The LCC connects the microcavity and the signal source. When subjected to a strain, the microcavity alters the signal from the signal source.

In still another aspect of the invention, a method for monitoring environmental conditions is provided which comprises transmitting a signal from a signal source, allowing the signal from the signal source to propagate through an LCC and a microcavity, and detecting an output signal from the microcavity using at least one detector. The microcavity, which comprises one or more reflective surfaces, alters the signal from the signal source as a result of a change in a dimension of the microcavity.

A method for monitoring environmental conditions is also provided comprising transmitting a signal from a signal source, allowing the signal from the signal source to propagate through an LCC and a microcavity, and detecting an output signal from the microcavity using at least one detector. Upon undergoing a deformation, the microcavity produces an output signal that has an intensity or frequency different from that of the input signal.

In the methods described above, the microcavity is preferably located within a cylinder head gasket of an engine.

Mirrored surfaces may be used at the ends of the microcavity to take advantage of the Fabry Perot interferometer effect wherein the property of light reflected within the cavity such as its frequency (more specifically, its resonance frequency) depends on the length of the cavity. Such strain gages should be insensitive to any pulling or manipulation of the incoming LCC strands. Also, the invention avoids the problems associated with "line-of-sight" type systems for monitoring, for example, piston combustion. In one embodiment of the invention, the cavity is filled with a suitable refractive polymer or other material to enhance the sensing system's sensitivity. Alternatively, a piezo-optic material may be used either within the cavity or directly coated on the LCC film trace at the sensing region.

DETAILED DESCRIPTION OF THE INVENTION

FIGS. 1–4 illustrate how sensing elements comprising a material such as a polymer are embedded in an LCC strand or trace which are incorporated in a cylinder head gaskets and connected to a powertrain system. Preferably, the LCC strands 106, 206 306, 406 pass within the gasket and reach a cylinder of the combustion system in one or more locations around the perimeter of the cylinder. The strands preferably terminate at a wall of each cylinder. Each termination point of the strand is directed to a combustion chamber inner wall to allow monitoring of parameters, such as pressure, that are essential to optimal engine performance. A sensor tip at the inner head gasket ring is preferably constructed to shield the sensor from the harsh internal environment of the compression chamber. The polymer material that channels the light signal may be routed along or manufactured as part of other engine structures such as intake manifolds and the like. Information obtained regarding the monitored parameters is routed along the channels to optical sensors and process control electronics.

Figure 1:
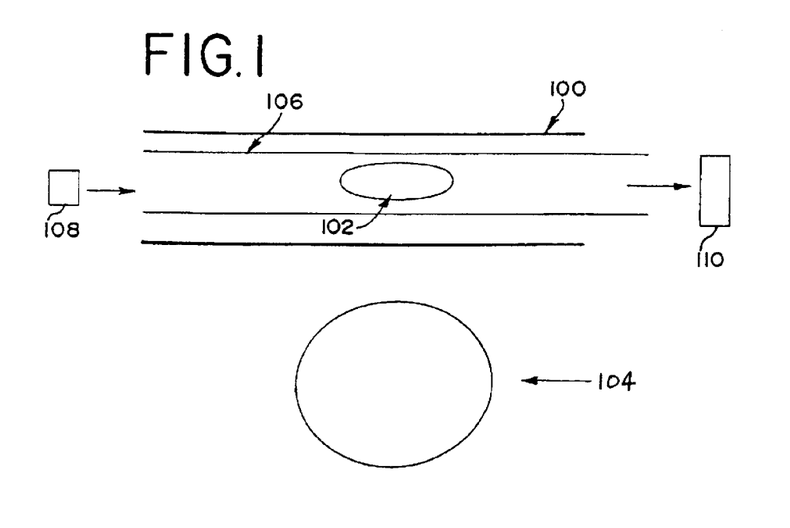
FIG. 1 shows an LCC-based strain gage sensor which is integrated into the cylinder head gasket 100.

FIG. 1 shows a configuration that includes an LCC-based strain gage sensor integrated into the cylinder head gasket 100. The ellipse 102 represents a high-strain area, which is located directly above a piston 104 in the LCC 106. The LCC may be in the form of a sheet or strand. An input signal enters the LCC from a signal source 108 and propagates through the LCC 106. On the other end of the LCC, the signal is received by a detector 110. In one aspect of the invention, the LCC alters the signal from the signal source upon undergoing a change in a dimension upon exposure to a strain.

Figure 2:
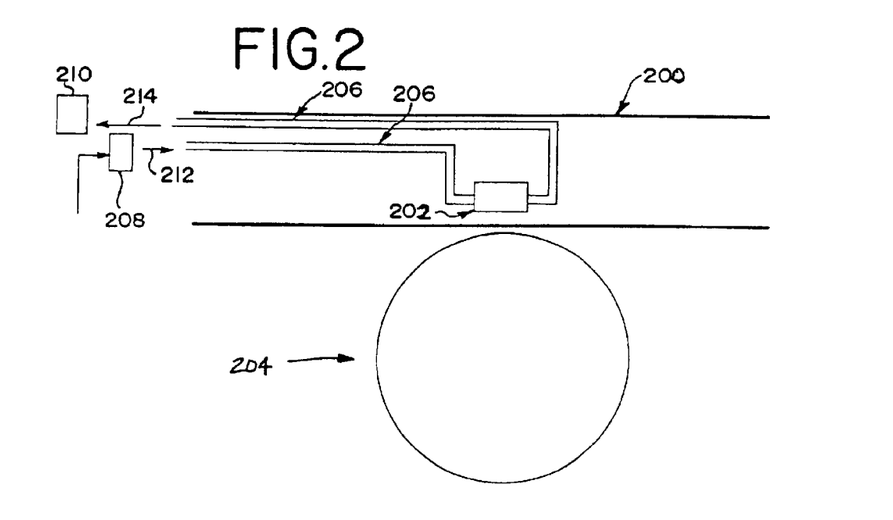
FIG. 2 depicts a microcavity which comprises a material such as a polymer and which is embedded in a cylinder head gasket.

FIG. 2 shows another configuration that shows a microcavity 202 that includes a material such as a refractive polymer which is embedded in a cylinder head gasket 200 in a region corresponding to the high-strain area 102 in FIG. 1 under a piston 204. The microcavity is preferably connected to a signal source or emitter 208 and a detector or receiver 210 via the LCC trace or strands 206 through which a light signal in the form of infrared light, for example, travels. An input signal 212 originates from the signal source 208 and enters the microcavity 202 through at least one of the LCC strands 206. Subsequently, an output signal 214 exits from the microcavity 202 through at least one of the LCC strands 206. The output signal 212 may then be directed to one or more receivers 210.

Inside a microcavity, which acts as a Fabry-Perot interferometer, a signal, such as a light signal, exists at frequencies called resonance frequencies $f_o$. These frequencies are a function of the microcavity length or the distance d separating the reflective surfaces at the ends of the microcavity. As the microcavity length d changes as a result of pressure or temperature variations, so do the resonance frequencies. The transmittance of an optical signal of frequency f is high if its frequency coincides with the resonance frequency $f_o$. Thus, the transmittance of light entering the microcavity will change as the microcavity length d changes. The measured transmitted frequencies thus provides a measure of the change in the cavity length, which in turn allows measurement of the in-cylinder pressure.

Figure 3:
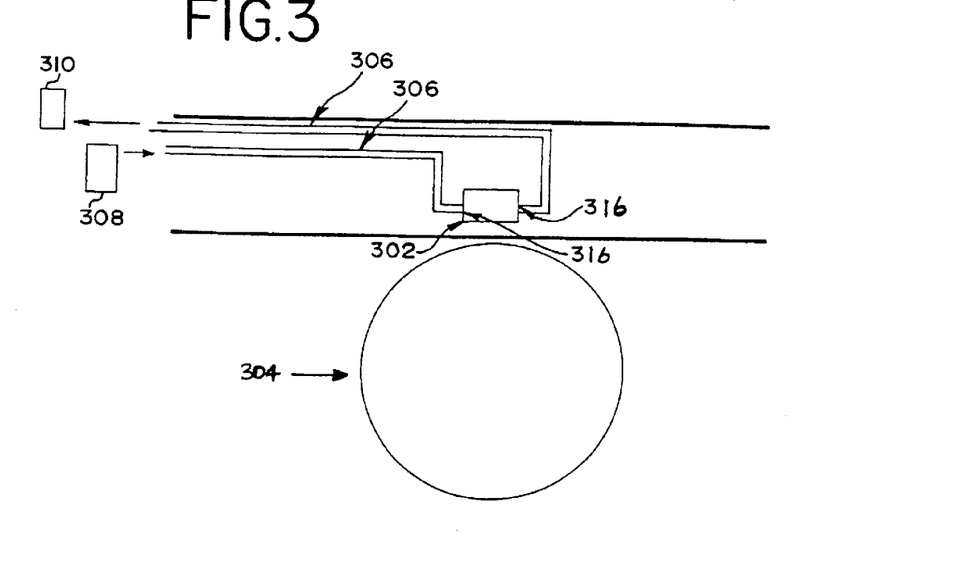
FIG. 3 illustrates a microcavity having ends that are coated with reflecting surfaces.

FIG. 3 shows a microcavity 302 adjacent a piston 304, the ends of which are coated with reflecting surfaces 316. The reflecting surfaces 316 preferably oppose each other and are aligned to be as parallel as possible. A signal from the signal source 308, such as an IR source, enters and propagates through the LCC 306. After passing through the microcavity 302, which is coated with reflecting surfaces 308, an output signal from the microcavity 302 is received by a detector 310. Preferably, the outer surfaces of the microcavity are coated with antireflection layers. In one aspect of the invention, the "mirrors" of the microcavity, which serve as a Fabry-Perot interferometers, are formed by depositing reflective coatings such as dielectric reflective coatings on both sides of the microcavity containing the polymer. For certain applications, the microcavity ends may be left uncoated in which case internal reflections within the cavity would occur due to a refractive index mismatch between the microcavity and the LCC sheet or strand.

Figure 4:
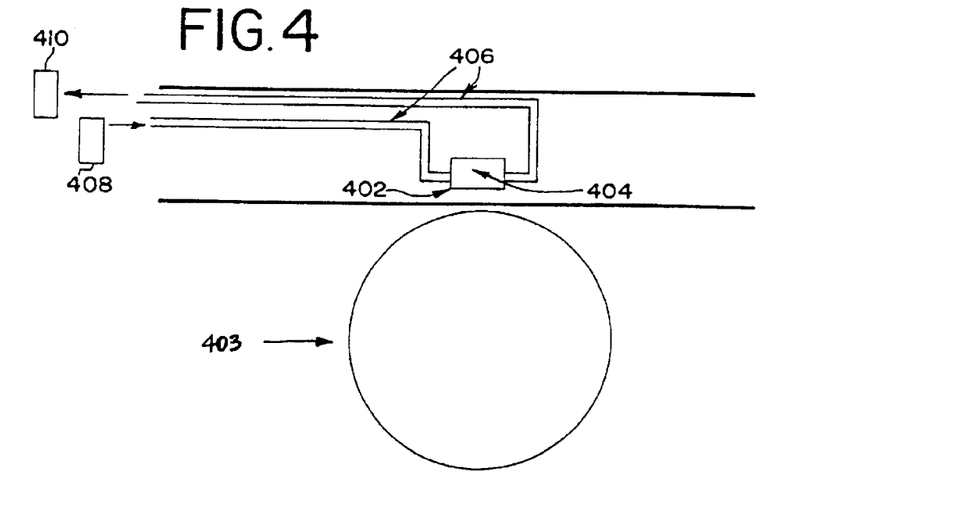
FIG. 4 depicts a microcavity containing a polymer as a sensing element.

FIG. 4 depicts another aspect of the invention. In FIG. 4, a polymer 404, e.g., a polymer such as polyvinylidene fluoride (PVDF) or copolymers of PVDF, is used as a sensing element in the microcavity 402. An input signal from the signal source 408, such as an IR source, enters and propagates through the LCC 406. After passing through the microcavity 402 (adjacent piston 403) which is coated with a the polymer 404, an output signal from the microcavity 402 again propagates through the LCC 406 and is received by a detector 410. The output signal received by the detector 410 may then undergo further processing. In another aspect, a polymer 404 such as polyethylene terephthalate is used as the sensing element.

Preferably, the microcavity 202, 302, 402 is located within a cylinder head gasket 200 of an engine. Preferably, the cylinder head gasket 200 is sufficiently flexible to withstand repeated contractions and expansions of the engine during cooling and heating. The cylinder head gasket 200 may comprise one or more materials such as steel, copper, or asbestos. The cylinder head gasket 200 is preferably coated with a polymer such as polytetrafluoroethylene. Metal gaskets may be prepared or manufactured using techniques for fabricating substrates, such as etching, plating selective deposition, and lamination.

The in-cylinder pressure may be determined from the in-cylinder temperature or change in temperature, which may be calculated from the coefficient of thermal expansion of a microcavity material and the microcavity length change. The microcavity length change in turn can be determined from the measured resonance or transmitted frequencies. Preferably, the cavity length varies linearly with the in-cylinder pressure or temperature.

Thus, an in-cylinder pressure may be determined from the extent of microcavity deformation. The in-cylinder pressure may be determined by calculating the temperature change in the cylinder based on, for example, the change in length of a microcavity material arising from a change in the in-cylinder temperature, and hence in-cylinder pressure.

In one aspect of the invention, a frequency of the output signal, i.e., the signal coming out of the microcavity 202, 302, 402, is different from a frequency of the input signal, i.e., the signal going into the microcavity 202, 302, 402. In another aspect, a peak frequency of the output signal is different from a peak frequency of the input signal. Alternatively, an output signal intensity is different from an input signal intensity.

Preferably, the microcavity 202, 302, 402 comprises one or more piezo-optic materials. In one aspect of the invention, the microcavity 202, 302, 402 is filled with a suitable refractive polymer or other suitable material or combination of materials to enhance the sensing system's sensitivity.

Preferably, the microcavity 202, 302, 402 undergoes deformation as a cylinder goes through a firing sequence. At least one of the sensing element or material in the microcavity 202, 302, 402 preferably undergoes a change in dimension, preferably its length.

While optical fibers are sometimes used in place of wires or incorporated in a molded structure, optical fibers increase the cost of the electronic component system. Additionally, the integration of optical and electrical components is not ideally suited for high volume manufacturing because of difficulties in assembly.

Preferably, the LCC trace or strand 106, 206, 306, 406 comprises a polymeric material. The material comprising the LCC strand 106, 206, 306, 406 may be polypropylene, polyethylene, polyisobutylene, polyacrylonitrile, poly(vinyl chloride), poly(methyl metacrylate), silica, polycarbonate, polyethylene terephthalate, or acrylic. Preferably, the LCC strands 106, 206, 306, 406 comprise a polymeric material. Preferably, the polymeric material is a photorefractive polymer.

The polymeric material that channels the light signal may be routed along or manufactured as part of other engine structures such as intake manifolds and the like. Preferably, information obtained from the sensing system that relates to the monitored parameters such as pressure is routed along the LCC strands 106, 206, 306, 406 to optical sensors and process control electronics.

Preferably, the LCC strand material is made of one or more materials that permit light of various wavelengths pass or diffuse through the material. Thus, the LCC strands 106, 206, 306, 406 may comprise one or more transparent or translucent materials. The LCC strands 106, 206, 306, 406 may also comprise a first material transparent or translucent to a first frequency of the signals and a second material transparent or translucent to a second frequency of the signals.

The LCC strands 106, 206, 306, 406 may have various configurations such as curvilinear, wavy, and asymmetrical. The LCC strands 106, 206, 306, 406 may also have various dimensions including non-uniform thickness, width, and length. The LCC strands 106, 206, 306, 406 may be a molded material such that the material may be cast and then cured to a desired shape. Preferably, the LCC strands 106, 206, 306, 406 is a moldable material so that the material can be flexed or formed to a desired shape. The LCC strands 106, 206, 306, 406 may have parts or areas that are ironed or otherwise pressed onto a surface of a PC board. The LCC strands 106, 206, 306, 406 may comprise multiple LCC strands 106, 206, 306, 406 separated by a reflective or absorptive material. The LCC strands 106, 206, 306, 406 can be integrally packaged with conductive board materials such as printed circuit boards, flexible substrates, flatwire, and MID circuits.

The LCC strands 106, 206, 306, 406 may have a reflective coating on one or more surfaces. The reflective coating may cover the entire surface or substantially the entire surface of the LCC strands except for the portions of the surface where the signal source 108, 208, 308, 408 and detector 110, 210, 310, 410 are operatively connected to the LCC strands 106, 206, 306, 406. In another aspect of the invention, the reflective coating covers one surface of the LCC strands 106, 206, 306, 406.

In yet another aspect of the invention, the reflective coating covers only the surface of the LCC strands 106, 206, 306, 406 across from signal source 108, 208, 308, 408 and the detector 110, 210, 310, 410. The reflective coating may comprise any material that reflects the signals in the LCC strands 106, 206, 306, 406. The reflective coating may comprise one or more metals or metallic alloys having aluminum, copper, silver, gold, or the like. The LCC strands 106, 206, 306, 406 may have a higher refractive index than the reflective coating.

Preferably, the signal source or emitter 108, 208, 308, 408 is a light source. More preferably, the signal source or emitter 108, 208, 308, 408 is an infrared light source. However, the signals may be of any electromagnetic frequency capable of transmission through the LCC strands 106, 206, 306, 406 and communication between the signal sources 108, 208, 308, 408 and the detectors 110, 210, 310, 410. The signals may also be a combination of electromagnetic frequencies. The signals may have one or more modulated signals or one or more coded signals. The signals may be amplified to allow a longer transmission distance. The signal source 108, 208, 308, 408 also includes, but is not limited to, an LED, visible light source, ultraviolet light source, or an RF source.

At least one signal source 108, 208, 308, 408 may transmit one or more signals through the LCC strands 106, 206, 306, 406. The signal preferably essentially diffuses throughout the entire volume of the LCC strands 106, 206, 306, 406. As used herein, "essentially diffuses" includes the case wherein each signal propagates in various directions within the LCC strands 106, 206, 306, 406 unless the signal source or another component blocks the signal, or the surface of the LCC strands 106, 206, 306, 406 reflects the signal. The signals may propagate along the same or opposite directions. The detectors 110, 210, 310, 410 may be positioned in any suitable location on the surface of the LCC strands 106, 206, 306, 406 to receive one or more signals. Multiple detectors may receive the signal from a single signal source.

Preferably, the signal source 108, 208, 308, 408 and detectors 110, 210, 310, 410 are operatively connected to one or more surfaces or ends of the LCC strands 106, 206, 306, 406. Each signal source 108, 208, 308,408 and each detector 110, 210, 310, 410 may be on the same or different surfaces of the LCC strands 106, 206, 306, 406. "Operatively connected" includes the formation of an optical, electrical, or other interface for transmitting and receiving the signals through the LCC strands 106, 206, 306, 406. "Operatively connected" also includes attachment configurations, attachment substances, other attachment mechanisms, or a combination thereof to affix the signal sources 108, 208, 308, 408 and the detectors 110, 210, 310, 410 onto the LCC strands 106, 206, 306, 406. The attachment configurations include physical adaptations of the LCC strands 106, 206, 306, 406 such as an indentation or a pressure fit structure. The attachment substances include adhesives, resins, solder, and the like.

In one aspect of the invention, each signal source 108, 208, 308, 408 transmits one or more signals through the LCC strands 106, 206, 306, 406 to one or more of the detectors or collectors 110, 210, 310, 410. Preferably, the signal sources 108, 208, 308, 408 transmit one or more signals in response to an input signal from the electronic component system. The signal sources 108, 208, 308, 408 may transmit one or more signals continuously, in pulses, or alternatively between multiple signals. The signal sources 108, 208, 308, 408 may be an electromagnetic radiation generation device. In one aspect of the invention, each signal source 108, 208, 308, 408 is a visible light generation device such as a light emitting diode (LED). In another aspect, each signal source is a radio frequency (RF) generation device such as an RF transmitter. In still another aspect, a first signal source is an electromagnetic radiation generation device such as a green LED and the second signal source is another electromagnetic radiation generation device such as a blue or infrared LED.

A signal source 108, 208, 308, 408 and a detector 110, 210, 310, 410 may be integrated into a component such as an RF transceiver, which may transmit a first signal at one time and receive a second signal at another time. The first and second signals may have the same or different frequencies.

Signals such as optical signals from optoelectronic transmitters can be channeled or transported through air to reach their destination if there are no obstacles in their path of travel. If no obstacles are present, the transmitters preferably generate a unique wavelength of a light signal and preferably, a wavelength selective filter is placed in front of the detector so there is little or no interference between different transmitters and detectors. Communication through the air is achieved using a single wavelength of light for all the transmitters and detectors by incorporating a code before each signal so only the designated detector or detectors will recognize the code and respond to the signal.

Preferably, at least one of the detectors 110, 210, 310, 410 is an electromagnetic radiation reception or collection device such as a photodiode or an RF detector. The detectors 110, 210, 310, 410 may receive or collect one or more signals from the LCC strands 106, 206, 306, 406. Preferably, the detectors 110, 210, 310, 410 provide an output signal to the electronic component system in response to the signal from the LCC strands 106, 206, 306, 406. The detectors 110, 210, 310, 410 preferably have one or more frequency specific filters to reduce or eliminate interference from signals with different frequencies. The frequency specific filter selectively allows a particular detector to receive a signal having a particular frequency or a narrow range of frequencies.

The detector 110, 210, 310, 410 includes, but is not limited to, photodiodes, microchannel plates, photomultiplier tubes, or combination of detectors. The input signal 210 from the signal source 108, 208, 308, 408 may be continuous, pulsed, or a combination of continuous and pulsed signals.

Figure 5A:
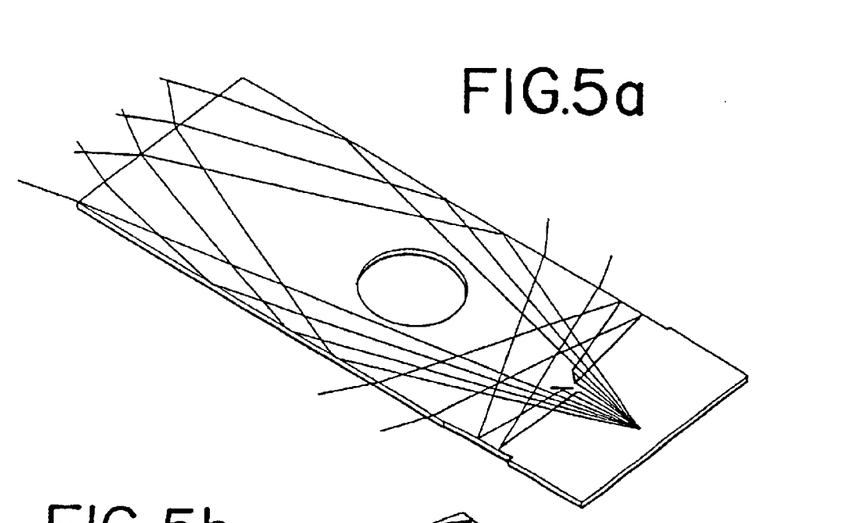
FIGS. 5a-b show a scheme for splitting and redirecting a light signal to different points or locations, which may used in one or more preferred embodiments of the invention.

FIG. 5a illustrates how a light signal can be split and redirected to different points or locations. This configuration may be used in conjunction with the sensing technology of the invention which comprises a microcavity as described above. To avoid obstructions in the travel path of a light signal, a method of redirecting the light signal can be implemented into the substrate so as to bypass obstructions along its path. A plastic or metal insert with reflective surface properties at desired angles can be molded inside the substrate at appropriate locations so as to direct the light signal in the desired course of travel. A light transmitter may be used as a diverging or diffusing element so the output can cover a large volume of the substrate. If a narrow beam is used, such as a well collimated laser beam, a diffuser may be added between a light source and the substrate. An element or component through which the light signal enters the substrate may also be roughed up so as to act as a diffuser to disperse the light signal. By the same principle, the light signal can be directed and redirected using a rough surface elsewhere within the substrate so that multi-directional transferring is achieved.

Figure 5B:
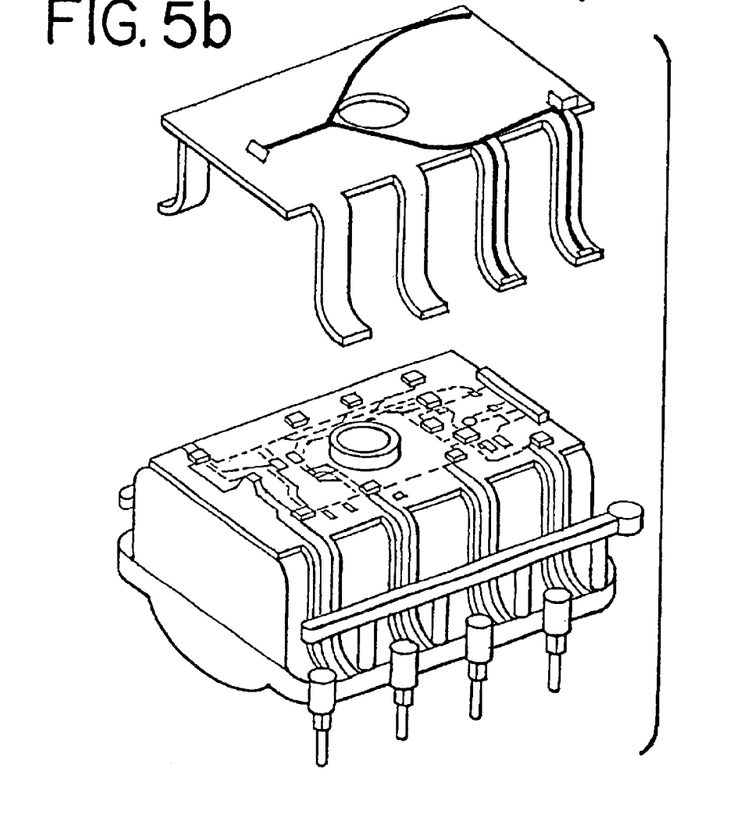

FIG. 5b depicts an application, such as an Integrated Powertrain Control System, wherein the microcavity-based sensor of the invention may be used. For a given obstruction in a layer of the substrate, the directional splitter will reroute a light signal using a molded piece of material such as plastic, metal or a rough surface to diffuse the light signal to avoid the obstacle in the original path of the light signal. Further, molded in reflectors are shown so that the light signal can further be redirected to a desired location.

FIGS. 6a-e represent a perspective view of an electronic component system having an LCC which may be integrated with or used in conjunction with the LCC-based strain gage of the present invention. The electronic component system may be an integrated powertrain control system (IPCS) or a similar or different electronic system. In this configuration, the IPCS circuitry is both optical and electrical. Two integrated circuits (IC) that control the timing of a firing of 8 sparks of an 8-cylinder engine can be replaced and controlled by one or more optoelectronic devices, for example a transmitter. Light signals, as opposed to electrical signals of a standard power distribution system, can be transmitted representing digital signals. The light signals received at each cylinder spark location are used to switch on and off an ignition coil so that an electrical firing spark is generated to ignite and combust an air and fuel mixture in a cylinder. Further, with respect to fuel injection, the optoelectronic chips can replace I/C chips that control the opening and closing of valves for the fuel injection ports.

Figure 6A:
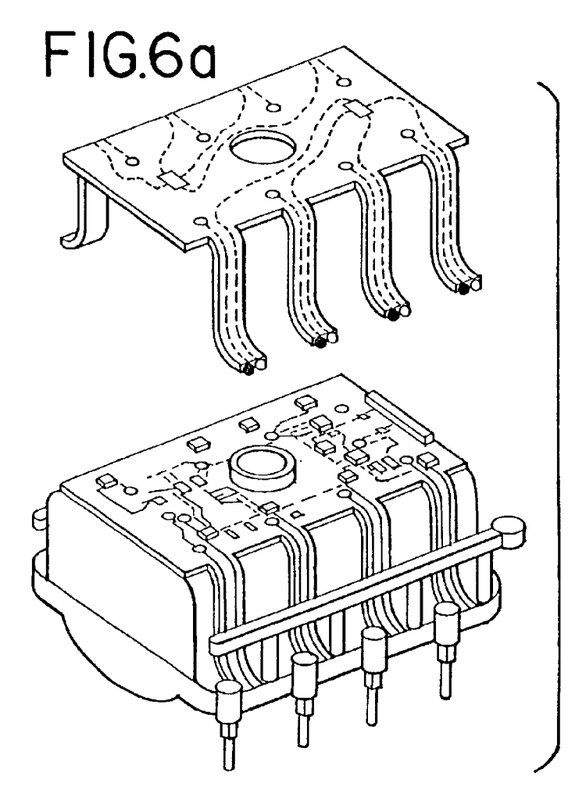
FIGS. 6a-e show a perspective view of an electronic component system such as a powertrain system with integrated LCC, which may used in one or more preferred embodiments of the invention.
Figure 6B:
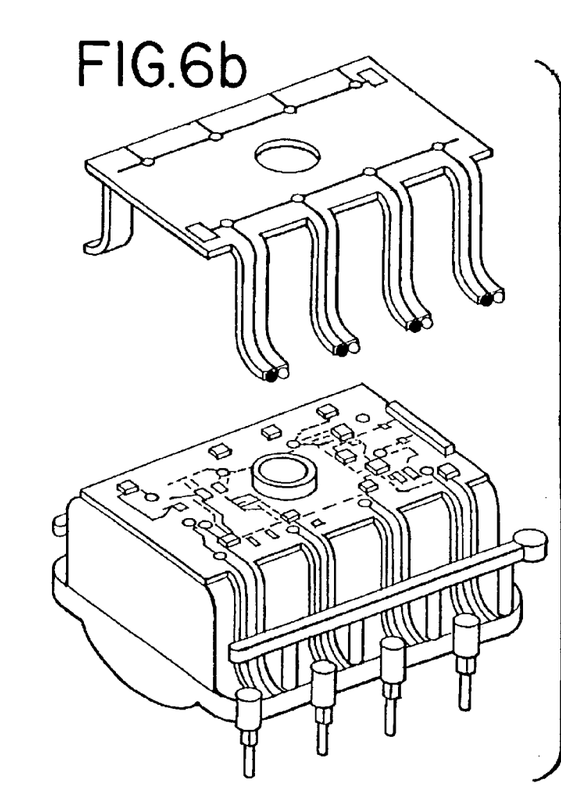
Figure 6C:
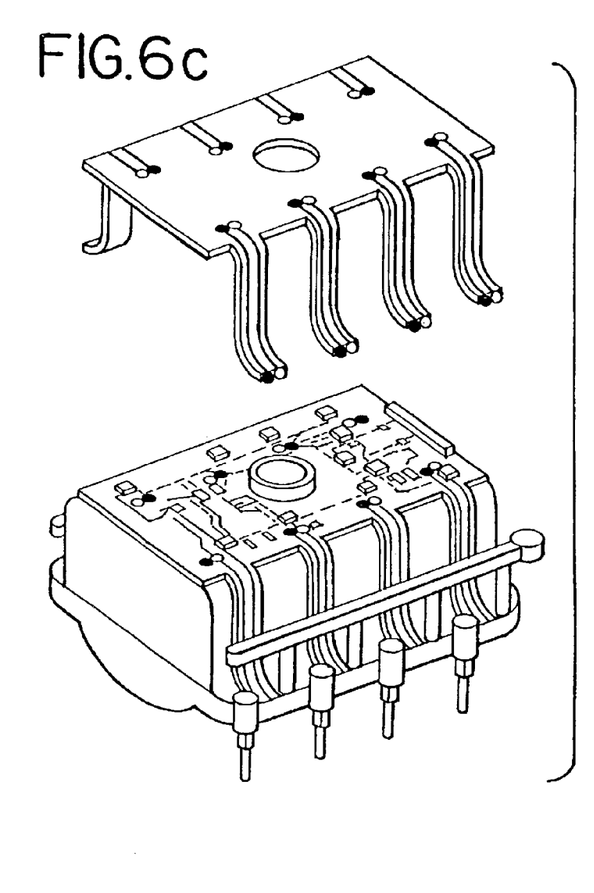
Figure 6D:
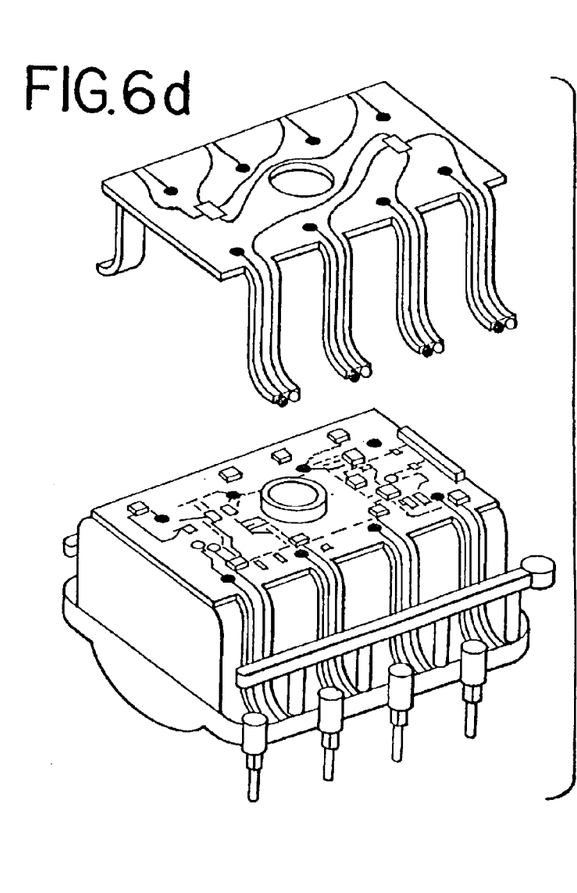
Figure 6E:
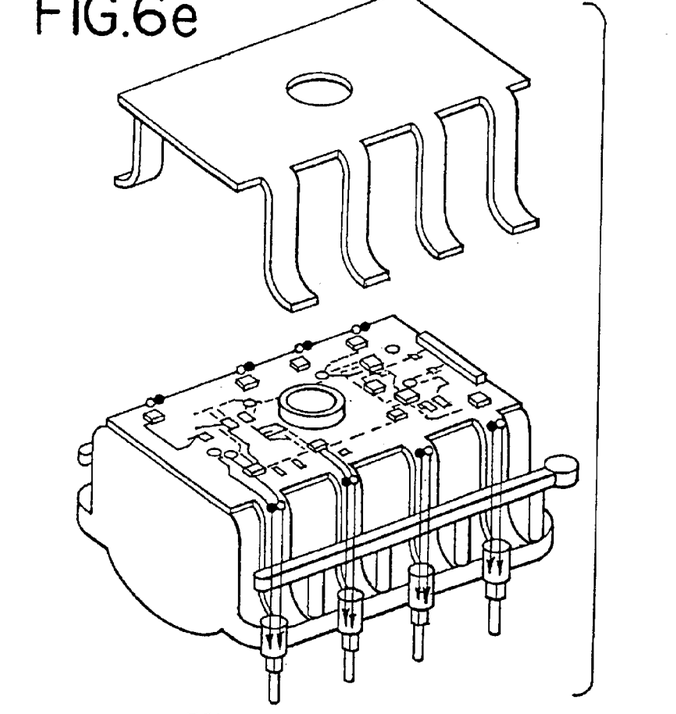

FIG. 6a represents an IPCS system that comprises an emitter for the fuel injection, an emitter for the firing spark, a receiver for the fuel injection, a receiver for the firing spark, and an LCC which carries the signal from a signal source. Since light paths do not interfere with each other, only one wavelength of light in a transmitter may be used for all communications. FIG. 6b represents an IPCS system whereby the light travels in a molded wave guide. In this configuration, a transmitter for the firing spark and the fuel injection uses the same light channel. FIG. 6c represents an IPCS system wherein a cylinder has an individual emitter for every firing spark cylinder and has an individual emitter for every fuel injection port. A light channel in this configuration is molded into the substrate. FIG. 6d represents an IPCS system whereby light travels in a molded wave guide. In this configuration a transmitter for the firing spark and the fuel injection uses a same light channel. FIG. 6e represents an IPCS system whereby every cylinder has an individual emitter for each firing spark cylinder and has an individual emitter for every fuel injection port. The signals may be transmitted using RF communication.

Figure 7:
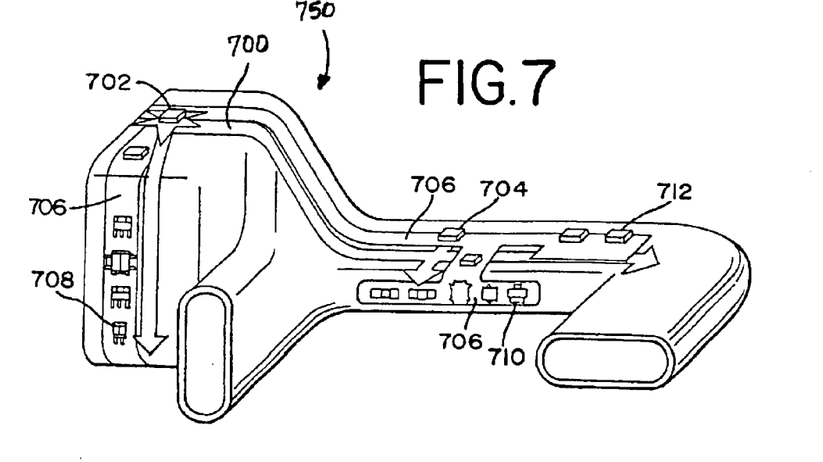
FIG. 7 shows a perspective view of an electronic component system with an LCC, which may used in one or more preferred embodiments of the invention.

FIG. 7 represents a cutaway view of an electronic component system 750 having an LCC 700. This electronic component system may be used or connected with the microcavity-based sensing technology of the invention as described above. The electronic component system 750 may be an automotive control panel or another electrical system as previously discussed. The LCC 700 comprises a first signal source 702, a second signal source 704, an LCC strands 706, a first detector 708, a second detector 710, and a third detector 712. The first signal source sends a first signal to the first detector 708 and the third detector 712. The second signal source sends a second signal to the second detector 710. The first and second signals may have the same or different frequency.

Figure 8:
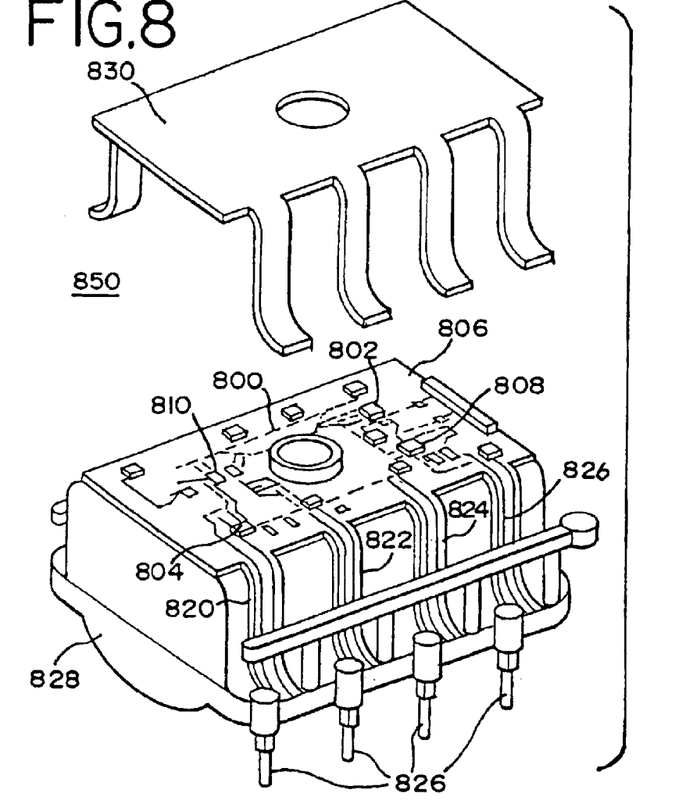
FIG. 8 shows a cutaway view of an electronic component system having an LCC, which may used in one or more preferred embodiments of the invention.

FIG. 8 is a perspective view of an electronic component system 850 having an LCC 800. This electronic component system may be used or connected with the microcavity-based sensing technology of the invention as described above. The electronic component system 850 may be an integrated power train control system or another electrical system as previously discussed. The electronic component system 850 preferably also has a base 828 and a cover 830. The LCC 800 preferably comprises signal sources 802 and 804, an LCC strands 806, and detectors or collectors 808 and 810. The LCC strands 806 may be disposed across and may be incorporated with the base 828. The signal sources 802 and 804 and detectors 808, 810, and 812 are linked by wires 820, 822, 824, and 826 to pin connections 828, which connect to other components (not shown). Preferably, the signal sources 802 and 804 transmit the signals in response to an input signal from the pin connections 828. Preferably, the detectors 808, 810, and 812 transmit an output signal to the pin connections 828 in response to the signals.

Figure 9:
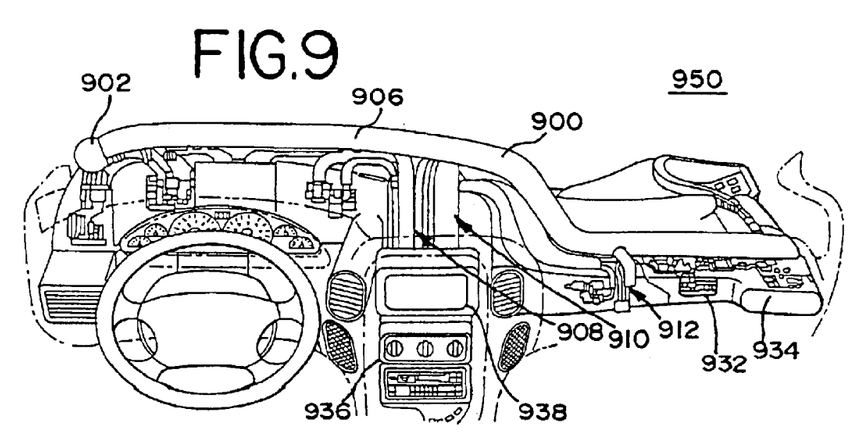
FIG. 9 shows a perspective view of an electronic component system having an LCC, which may used in one or more preferred embodiments of the invention.

FIG. 9 is a perspective view of an electronic component system 950 having an LCC 900. This electronic component system may also be used or connected with the microcavity-based sensing technology of the invention. The electronic component system 950 may be an automotive control panel or another electrical system as previously discussed. The LCC 900 comprises a signal source 902, an LCC strands 906, a first detector 908, a second detector 910, a third detector 912, a fourth detector 932, and a fifth detector 934. The signal source 902 sends a signal in response to an input signal from a central processing unit (not shown). The signal passes through the LCC strands 906 to the detectors 908, 910, 912, 932, and 934. The first detector 908 sends a first output signal to an external electrical device such as an environmental control device 936. The second detector 910 sends a second output signal to another external electrical device such as an audio control device 938. Similarly, the third, fourth, and fifth detectors send output signals to other external electronic devices. The signal may be a coded signal or may be a modulated signal.

Various aspects of the invention have been described and illustrated. However, the description and illustrations are by way of example only. Other configurations and implementations are possible within the scope of this invention and will be apparent to those of ordinary skill in the art.

Therefore, the invention is not limited to the specific details, representative embodiments, and illustrated examples in this description. Accordingly, the invention is not to be restricted except in light as necessitated by the accompanying claims and their equivalents.

What is claimed is:

1. A system comprising:
    a signal source,
    a microcavity through which an input signal from the signal source passes, and which alters the input signal as a result of a response of the microcavity to a strain,
    a first LCC that connects the microcavity and the signal source and through which the input signal propagates,
    at least one detector that receives an output signal from the microcavity, and
    a second LCC that connects the microcavity to the at least one detector, the first and second LCC truncating at the microcavity.

2. The system of claim 1, wherein the microcavity is located within a cylinder head gasket of an engine.

3. The system of claim 1, wherein the microcavity is filled with one or more piezo-optic materials.

4. The system of claim 1, wherein the first and second LCC comprises a polymer.

5. The system of claim 1, wherein the first and second LCC comprises polyethylene terephthalate, polypropylene, polyethylene, silica, or polycarbonate.

6. The system of claim 1, wherein the signal source is a light source or an RF source.

7. The system of claim 1, wherein the signal source is selected from a group consisting of an infrared light source, visible light source, and an ultraviolet light source.

8. The system of claim 1, wherein the detector is a photodetector.

9. The system of claim 1, wherein the microcavity undergoes a change in dimension as an engine cylinder goes through a firing sequence.

10. The system of claim 1, wherein microcavity includes partially reflecting surfaces.

11. The system of claim 1, wherein a frequency or an intensity of the output signal is different from a frequency or en intensity of the input signal.

12. A system comprising:
    a signal source,
    a microcavity through which an input signal from the signal source passes, and which alters the input signal as a result of a change in a dimension of the microcavity,
    an LCC that connects the microcavity and the signal source and through which the input signal propagates, the LCC and microcavity having a refractive index mismatch, and
    at least one detector that receives an output signal from the microcavity.

13. The system of claim 12, wherein the microcavity is located within a cylinder head gasket of an engine.

14. The system of claim 12, wherein the signal source is a light source or an RF source.

15. The system of claim 12, wherein the microcavity one or more piezo-optic materials.

16. The system of claim 12, wherein the LCC comprises a polymer.

17. The system of claim 12, wherein the LCC comprises polyethylene terephthalate, polypropylene, polyethylene, silica, or polycarbonate.

18. The system of claim 1, wherein the microcavity is filled with a refractive polymer.

19. The system of claim 12, further comprising a second LCC that connects the microcavity to the detector.

20. The system of claim 19, wherein the LCC and the second LCC truncate at the microcavity.

21. The system of claim 1, wherein the microcavity forms an interferometer.

22. The system of claim 1, wherein there is a refractive index mismatch between the microcavity and the LCC.

23. The system of claim 10, wherein the partially reflecting surfaces are located at an end surface of the LCC that faces the microcavity.

24. The system of claim 12, wherein the microcavity has one or more reflective surfaces through which the input signal passes.

* * * * *